United States Patent [19]

Smalley

[11] 4,188,912

[45] Feb. 19, 1980

[54] ANIMAL FEEDING APPARATUS

[76] Inventor: Benjamin M. Smalley, Causeway Farm, Hoghton, Near Preston, Lancashire, England

[21] Appl. No.: 792,886

[22] Filed: May 2, 1977

[30] Foreign Application Priority Data

May 15, 1976 [GB] United Kingdom ............... 20172/76
Oct. 7, 1976 [GB] United Kingdom ............... 41629/76

[51] Int. Cl.² ............................................... A01K 5/02
[52] U.S. Cl. ................................................... 119/51 R
[58] Field of Search ....................................... 119/51 R

[56] References Cited

U.S. PATENT DOCUMENTS

| | | | |
|---|---|---|---|
| 3,465,724 | 9/1969 | Broadbent | 119/51 R |
| 3,557,757 | 1/1971 | Brooks | 119/51 R |
| 3,850,145 | 11/1974 | Yoder et al. | 119/51 R |

Primary Examiner—Russell R. Kinsey
Assistant Examiner—Daniel J. Leach
Attorney, Agent, or Firm—Norris & Bateman

[57] ABSTRACT

A method and apparatus for providing special food to a selected plurality of animals in a herd which includes providing a distinguishing device on each of said selected plurality of the animals, and providing a supply of foodstuff in an enclosure having a movable barrier which in a position of rest prevents access to that foodstuff supply and is locked in the rest position by a releaseable lock device. The device is so controlled that the barrier is released for animal access to the food only in response to the proximity of any one of the distinguishing devices, so that all of the selected plurality of animals, and only those selected plurality of animals, have access to the supply of foodstuff. A battery powered low electrical consumption control circuit is provided.

12 Claims, 4 Drawing Figures

ANIMAL FEEDING APPARATUS

The invention provides a method of providing special food to a selected plurality of animals in a herd which method includes the steps of: providing a distinguishing device on each of said selected plurality of animals in said herd of animals; presenting to said herd, a supply of foodstuff in an enclosure giving restricted access, whereby only one of said animals at a time can eat from said enclosure; providing a movable barrier which in a position of rest prevents access to said foodstuff supply in said enclosure; locking said barrier in said position of rest by a releaseable locking means, and controlling said releaseable locking means so that said barrier is released in response to the proximity of any one of said distinguishing devices, whereby all said selected plurality of animals, and only said selected plurality of animals have access to said supply of foodstuff.

The invention also provides apparatus for carrying out the method, which apparatus comprises a food container having a movable barrier biased in a closed position, but capable of opening movement when pushed by the head of an animal away from said closed position to give access to feed in the container; releaseable locking means normally locking said barrier in said closed position; battery operated electrical release means for releasing said locking means, and electrical control circuit for controlling said release means, said control circuit including a proximity switch adapted to be operated by a distinguishing device carried by an animal, and so arranged that current is only drawn from said battery between the time when said proximity switch is operated and the time when said barrier is moved away from said closed position.

In animal husbandry, it is sometimes desirable to ensure that certain foodstuff is available to only selected animals, and that it is continually so available, without supervision at any rate throughout certain periods of time. Thus, on a dairy farm, for example, if the prepared feed is available only to the high yield cows (e.g. cows within say 100 days after calving) one thereby ensures that the best use is made of the feed, because the low yield cows are able to subsist on vegetation, but the high yield cows need the extra nutrition provided by the prepared feed, if they are to produce the maximum good quality milk. Furthermore, if the herd receives all its prepared feed at the usual milking time, it is not possible to obtain as good a yield, as is the case if the feed is available in the so-called ad lib fashion at all times.

One form of feeding appliance which is intended to provide efficient feeding of an animal herd includes an auger adapted to deliver prepared feed to a feeding position where it is accessible to the beasts, the auger being controlled by a proximity switch adapted to detect the presence of an animal carrying a distinguishing device (e.g. a metal chain). Hence only those animals which have been fitted with the distinguishing device can obtain feed from the appliance, and they can receive the feed ad lib, whenever they approach close enough to the appliance, to operate the auger.

There are at least three important disadvantages of the auger type ad lib feeding appliance, which the present invention seeks to avoid. In the first place, since the auger type feed includes an electric motor, driving the auger through gearing, and the auger itself has to be mounted in journal and thrust bearings, it will be appreciated that the cost of the appliance is considerable, and it is necessary to provide electrical cabling to the appliance. Furthermore, each time the auger type appliance is operated by proximity of an animal, power is consumed, and this adds to the cost of running the installation. Perhaps even more important however is the fact that most animals are easily frightened by the noise of the electric motor and the driving mechanism for the auger, and sometimes the animals do not take the feed for this reason.

In the Specification of United Kingdom Pat. No. 1,187,383, there is described an animal husbandry arrangement, which is principally intended to be used for the experimental feeding of animals penned in a group, comprising a plurality of barrier means, electronic oscillator means associated with each said barrier means, each said oscillator means being tuned to oscillate to provide an electromagnetic field cyclically fluctuating at a given frequency different from those of the fields provided by the other oscillator means, each said oscillator means being arranged to cause actuation of said barrier means whenever its oscillation is damped sufficiently, and passive resonance means to be carried by each animal as an identification means, each said passive resonance means being tuned to resonate at one of said given frequencies, so that when an amimal approaches a said barrier means, the animal's identification means may damp the oscillation of the associated oscillator means but will only damp the oscillation sufficiently to actuate the barrier means approached if that oscillator means is tuned to the same frequency of oscillation as that of resonance of the animal's identification means.

The arrangement disclosed in Specification No. 1,187,383 is intended to be used to provide different foodstuffs to each of the animals of the herd as would be required in experimental farming. It is the object of the present invention to provide a method of feeding livestock and an animal feeding appliance for use in this method, which is of use in ordinary commercial farming.

According to this invention the method of feeding includes the step of providing a battery operated electrical control arrangement for the releaseable locking means, which arrangement draws current from the battery only between the time one of the selected plurality of animals approaches close enough to the enclosure for its distinguishing device to actuate an electrical signal in the electrical control arrangement, and the time when the animal moves the barrier away from the position of rest. It is of advantage to be able to operate the appliance from an electric battery, as this avoids the necessity for cabling and permits the appliance to be sited remote from buildings (i.e. in a field or prairie). Battery operation is mentioned in United Kingdom Specification No. 1,187,383, but the arrangement described therein places a continuous load on the battery in driving the oscillator, and thus the battery will need frequent recharging. Moreover when the battery is discharged so that it can no longer operate the solenoid, the marked animals receive no special feed, and if this happens frequently part of the advantage of selective feeding is lost.

According to the invention an animal feeding appliance for carrying out the method of feeding previously referred to, comprises a food container having a movable barrier biased into a closed position, but capable of opening movement when pushed by the head of an animal away from the closed position to give access to feed in the container there being releaseable locking means normally locking the barrier in the closed position, battery operated electrical release means for releasing the locking means, and an electrical control circuit for controlling the release means, the control circuit including a distinguishing switch adapted to be operated by a distinguishing device carried by an animal, and arranged when so operated to operate said electrical release means, said electrical control circuit further including a battery protection switch arranged so that it only allows current to be drawn from the battery between the instant when the distinguishing switch is operated and the time when the barrier is moved away from its closed position, out of engagement with said locking means. As compared with the auger type appliance previously referred to, the appliance in accordance with the invention has no power driven parts, nor does it require the use of a relatively expensive auger and bearing arrangement, nor does it consume power. Furthermore, the appliance in accordance with the invention is practically silent in operation, and only the movement which takes place is that which is brought about by the animal itself, so that the animal is unlikely to be frightened by the appliance. As compared with the appliance described in United Kingdom Specification No. 1,187,383, there is the advantage that current is only drawn from the battery for very short periods, so that the battery will keep the appliance functioning for a long time between recharges or battery replacement.

Preferably the electrical release means comprises. It is also preferred that the distinguishing switch is adapted to be operated by a metallic distinguishing device, such as, for example, a chain.

In the preferred construction the barrier takes the form of a door or gate, hinged about a horizontal axis and loaded by gravity into the closed position. Preferably the barrier is of such dimensions and is so located in the container, that only one animal at a time is able to gain access to feed in the container. It is further preferred that the locking means comprises a movable element mounted for movement on a stationary part of the appliance, and the entire control circuit is mounted on stationary parts of the appliance.

According to another preferred feature of the invention the locking means comprises a blocking member movable between a locking position where it obstructs movement of the barrier away from the closed position, and a release position where it permits movement of the barrier away from the closed position, there being a movable latch on the barrier which engages with the blocking member when the latter is in the locking position and the barrier attempts to move away from the closed position, the arrangement of the latch being such that it is able to move with the barrier away from the closed position when the blocking member is in the release position, and that it is able to trip past the blocking member when the latter is in the locking position and the barrier is returning to the closed position, so that the barrier can return to the closed position even though the blocking member has returned to the locking position. Further it is preferred that the blocking member comprises a bar slidable axially, and formed with one or more cut outs, there being a part or parts on the barrier which in the locking position of the bar engage with the bar to prevent opening of the barrier, but which in the release position of the bar can pass through the cut out(s) whereby the barrier is permitted to open.

According to yet another preferred feature of the invention the bar opening is spring loaded into the locking position. It is further preferred that the appliance is formed with a recess in the vicinity of the proximity switch for locating a chain or like flexible distinguishing device attached to the neck of an animal. It is still further preferred that one or more protrusions are provided in the recess to assist in retaining the chain or like devices in the recess.

Other features of the invention will appear from the following description of a feeding appliance primarily intended for use with cattle, which is given here by way of example only, with reference to the accompanying drawings, in which.

Figure 1:
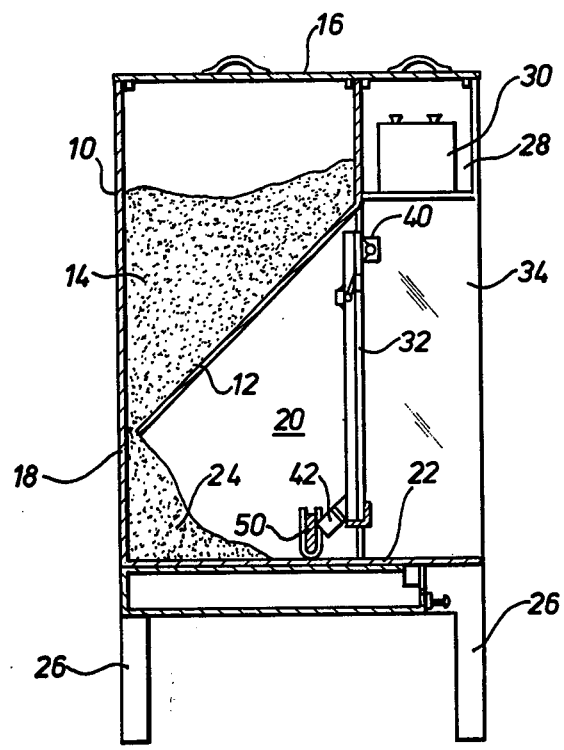
FIG. 1 is a diagrammatic cross-section through the feeding appliance.

The feeding appliance which is illustrated in the drawings can be referred to as an ad lib automatic out of parlour feeder, and will normally be positioned where it is freely accessible to a herd of cattle, for example in a field or prairie. Basically, the appliance comprises a feed hopper 10 having its walls manufactured from galvanised steel plate, and of generally rectangular horizontal cross-section. As illustrated in FIG. 1, there is an inclined chute 12, directed downwardly and rearwardly, and extending across the width of the hopper, thus providing a storage space 14. The storage space is closed at its upper end by a lid 16 and has a bottom outlet 18, which is always open, into a feeding area 20. The feeding area 20 has a floor 22, on which some of the foodstuff 24 flowing down through the outlet 18 rests. The appliance is provided with legs 26.

A chamber 28 extends across the front upper portion of the appliance, and encloses an electric battery 30, and electrical control gear (not shown) the purpose of which will appear hereinafter. The feeding area 20 is normally protected by a gate 32, and in the preferred construction, the gate 32 is quite narrow, so that it is only possible for the head of one cow at a time to pass through the space normally closed by the gate to gain access to the foodstuff 24 lying on the floor 22, and if the appliance is itself considerably wider than the gate, then there are outwardly splayed side walls 34 which in effect guide the head of an animal towards the centrally located gate 32.

Figure 3:
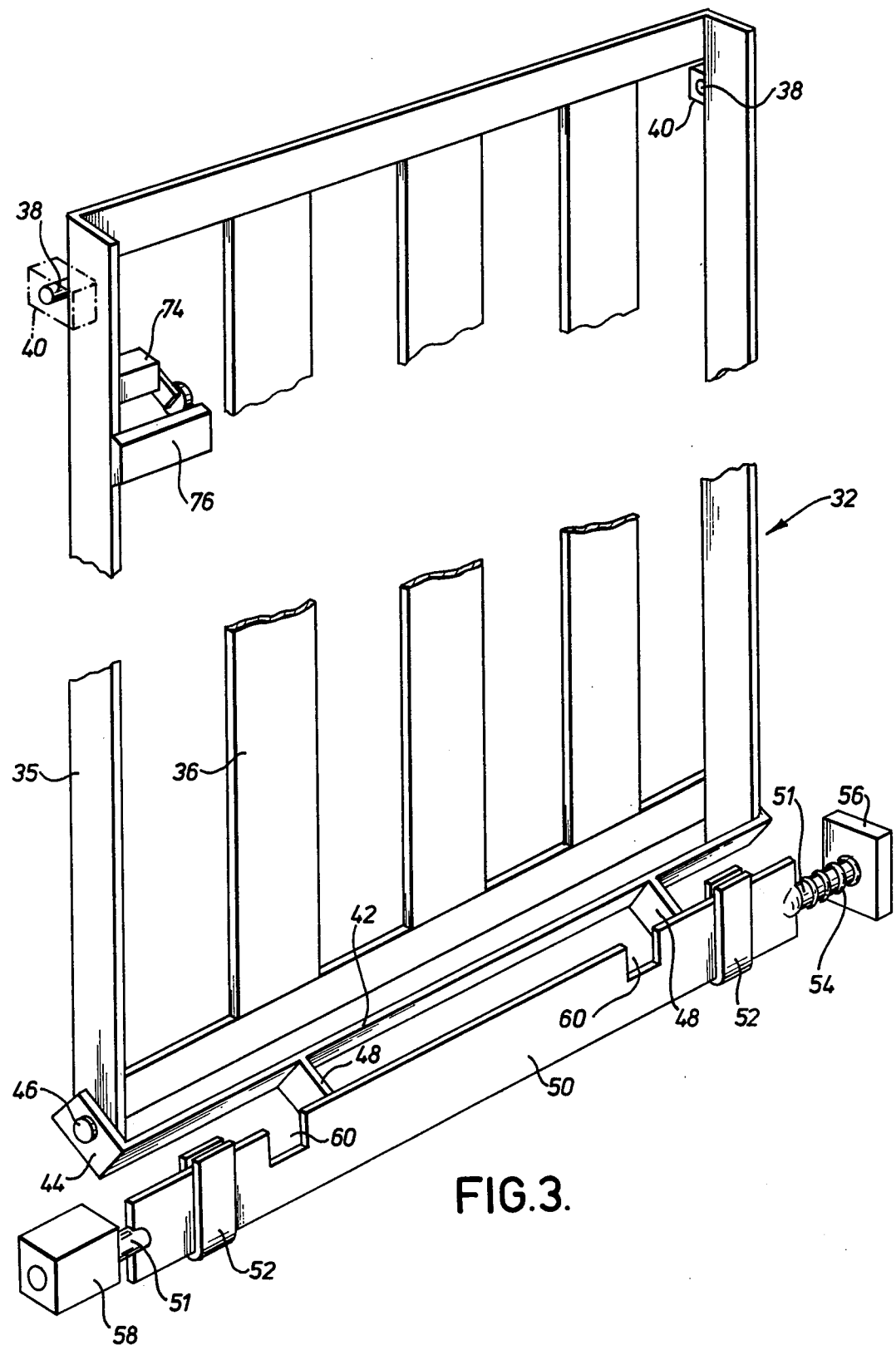
FIG. 3 is a perspective view of a gate looking on the inside.
Figure 4:
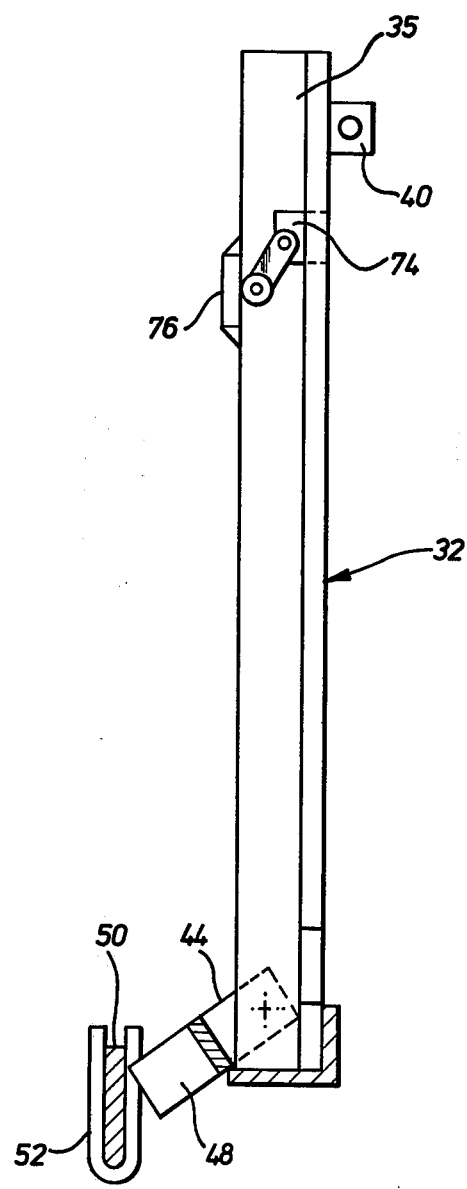
FIG. 4 is a vertical section through the gate shown in FIG. 3.

The gate itself is constructed from welded steel bars, forming a rectangular frame 35, and vertical slats 36 (see FIG. 3). Stub axles 38 are welded to the front of the frame 35 at its upper end, and are journalled in brackets 40 projecting from a wall of the hopper 10, so that the gate 32 is suspended from the stub axles 38 and is able to swing about the axis provided by these stub axles. It will be apparent from FIG. 1, that if an animal pushes the gate 32 with its head, the gate will swing inwardly and upwardly, until it rests against the chute 12, thereby giving the animal free access to any food 24 which is available within the feeding space 20. In this respect, the appliance can be regarded as an "ad-lib" feeder.

Now clearly, if no control were provided on the gate 32, it would be possible for any animal in the herd to gain access to the foodstuff 24, and this would be contrary to the purpose of the appliance, which is to ensure that foodstuff is only provided to selected animals of the herd, as a means of increasing the productivity of the herd.

Referring now to FIG. 3, a latch bar 42 extends across the inside lower part of the gate 32, and has brackets 44 at its ends, whereby it is pivoted on pegs 46 to the end frame members of the gate 32. In the normal rest position, the latch bar 42 engages against the lower ends of the end vertical members of the frame 35 due to its own gravitational loading, and in this position, the latch bar 42 is inclined at approximately 45° to the vertical, as appears in FIG. 3. A pair of tongues 48 is welded to the underside of the latch bar 42, at spaced apart positions.

A locking bar 50, which forms the blocking member of the invention, is slidable axially in a pair of U-shaped brackets 52, suspended from a fixed part of the appliance frame. At each end the locking bar 50 has a short cylindrical extension 51 and a compression spring 54 surrounding one of these extensions engages between one end of the locking bar 50 and a fixed bearing surface 56 inside the appliance, and normally holds the locking bar 50 in the locking position as illustrated. In this position, each of the tongues 48 on the latch bar is in alignment with an upper part of the locking bar 50, and consequently, if an animal attempts to push the gate 32 inwardly, the tongue 48 will engage with the bar 50, and further inward movement of the gate 32 is prevented. Hence, in this position, the locking bar 50 effectively locks the gate 32 in the closed position.

At the opposite end of the locking bar 50 to the spring 54, there is a solenoid 58 attached to the locking bar, and arranged so that when it is actuated, it pushes the locking bar 50 against the spring 54, into a release position, where a pair of notches 60 formed in the locking bar, are aligned respectively with the tongues 48 on the latch bar. Thus, whenever the solenoid 58 is actuated, it is possible for the gate to swing inwardly and upwardly into the open position, because the tongues 48 can pass through the notches 60 in the locking bar.

Figure 2:
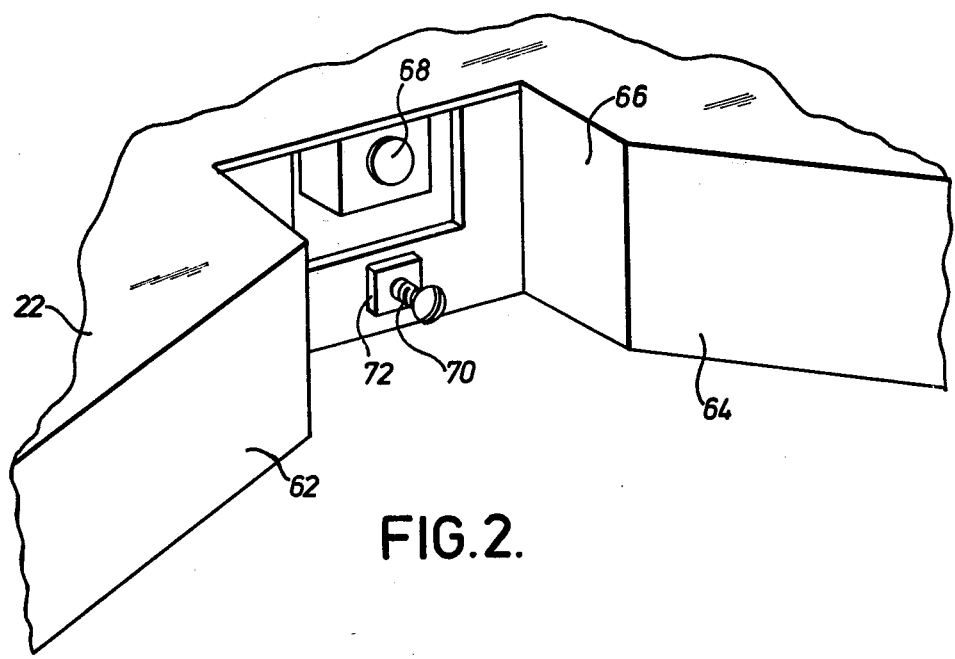
FIG. 2 is a detail perspective view of a detector arrangement.

Referring now to FIG. 2, it will be seen that the floor 22 is provided with front skirts 62 and 64, which are inclined inwardly and rearwardly towards a central recess 66 which may be two or three inches wide. The recess 66 is closed by walls depending from the floor 22, and a normally open proximity switch 68, which may for example be a reed switch, but which is in any case adapted to be closed by the proximity of a metal object, is suspended below the floor 22, in a cut-out formed in the rear wall of the recess 66, with the operative face of the proximity switch 68 flush with the front face of this rear wall. Underneath the proximity switch, a retaining bolt 70 is screwed into the rear wall of the recess, and is locked by a nut 72, in a position, where it projects by say one to two inches from the front face of the rear wall. The proximity switch 68 is arranged in series with the battery 30 and the solenoid 58, and the arrangement is such, that when the proximity switch is actuated, by the presence of a metal object, adjacent to the proximity switch (and in the recess 66) it causes energisation of the solenoid, thereby unlocking the gate 32.

A normally open limit switch 74 is mounted on a fixed front wall of the appliance, and is held in a closed position by a tab 76, welded to the frame 35 of the gate 32 so long as the gate is closed. However, the arrangement is such, that immediately the tongues 48 of the latch 42 have passed through the notches 60 of the locking bar 50, then the tab 76 will have moved so far away from its position of rest, that it will release the limit switch 74, and allow the latter to open. The limit switch 74 is arranged in the control circuit in series with the battery 30, the reed switch 68 and the solenoid 58, and when it is opened, the solenoid 58 is de-energised, allowing the bar 50 to move under the influence of the spring 54, back into the locking position. This of course will have no effect on the continued opening of the gate 32, because by that time, the tongues 48 will be out of engagement with the locking bar 50.

Selected animals in the herd—for example those which have calved within the last 100 days—are fitted with a chain hanging below the neck of the animal. If an animal without such a chain approaches the feeding appliance, the gate 32 will remain in the locked position, and that animal will not be able to obtain feed. If on the other hand, any one of the selected animals wearing a chain approaches the appliance, then as its head pushes forward in an attempt to nudge the gate open, the chain will enter the recess 66, and in this position, it will actuate the proximity switch 68, thereby releasing the gate 32. That animal can then push the gate upwardly and inwardly to gain access to the foodstuff 24 lying on the floor 22.

Even if the animal moves its head from side to side, the chain will probably be retained within the recess 66, so that part of the chain will cause actuation of the proximity switch 68, and moreover the bolt 70 will help to retain the chain within the recess 68. Hence there is unlikely to be continual switching of the proximity switch 68 (such switching can have a disturbing effect on the animal).

Whenever the animal withdraws its head from the feeding area 20, the gate 32 will fall towards the closed position, and when the tongues 48 engage with the rear side of the locking bar 50, the latch 42 will turn about its pivots 46, to allow the tongues to pass over the locking bar 50, Once the latch is on the front side of the locking bar, it falls under gravity into its normal position of rest, so that the gate is once more locked. Of course, if the animal wishes to open the gate again, it can do so, providing it is carrying a chain which will operate the proximity switch.

It will be appreciated that the power consumption of the appliance is very small. This is because the solenoid 58 is only energised for a very short period of time, between the time when the switch 68 is closed by the arrival of the chain near to that switch and the time when the gate has moved sufficiently to open the switch 74, during which time the gate is moving past the locking bar 50. Throughout the period that the animal is feeding and, of course, when no marked animals approach the appliance, the solenoid remains de-energised.

In a refined form of the invention, instead of the hopper 14 being open into the feeding space 20, an automatic measured quantity feeding appliance is provided, which is actuated whenever the gate 32 is open, to deliver a predetermined quantity of foodstuff into the feeding area 20. Such feed mechanisms are known, and may for example, take the form of an auger, which is driven by an electric motor, for the purpose of feeding the foodstuff into the feeding area. However, it will be appreciated that if this kind of automatic feed is utilised, then one has to accept the disadvantages of the auger type appliance previously mentioned. The appliance can be adapted to operate from a mains electricity supply in addition to or as an alternative to the electric battery 30.

I claim:

1. An animal feeding appliance comprising a food container having a movable barrier biased into a closed position, but capable of opening movement when pushed by the head of an animal away from said closed position to give access to feed in the container; releasable locking means normally locking said barrier in said closed position; battery operated electrical release means for releasing said locking means, and an electrical control circuit for controlling said release means, said control circuit including a distinguishing switch adapted to be operated by a distinguishing device carried by an animal, and arranged when so operated to operate said electrical release means, said electrical control circuit further including a battery protection switch arranged so that it only allows current to be drawn from said battery between the instant when said distinguishing switch is operated and an instant when said barrier is moved away from said closed position out of engagement with said locking means.

2. An animal feeding appliance according to claim 1, in which said barrier is of such dimensions and is so located in said container, that only one animal at a time is able to gain access to feed in said container.

3. An animal feeding appliance according to claim 1, wherein said locking means comprises a movable element mounted for movement on a stationary part of said appliance, and said control circuit is entirely mounted on stationary parts of said appliance.

4. An animal feeding appliance comprising a food container having a movable barrier biased into a closed position, but capable of opening movement when pushed by the head of an animal away from said closed position to give access to feed in the container; releaseable locking means normally locking said barrier in said closed position; battery operated electrical release means for releasing said locking means, and an electrical control circuit for controlling said release means, said control circuit including a distinguishing switch adapted to be operated by a distinguishing device carried by an animal, and so arranged that current is only drawn from said battery between the time when said distinguishing switch is operated and the time when said barrier is moved away from said closed position, said locking means comprising a blocking member movable between a locking position where it obstructs movement of said barrier away from said closed position, and a release position where it permits movement of said barrier away from said closed position; a movable latch on said barrier which said movable latch engages with said blocking member when said blocking member is in said locking position and said barrier attempts to move away from said closed position; said latch being so arranged, that it is able to move with said barrier away from said closed position when said blocking member is in said release position, and said latch being further so arranged, that it is able to trip past said blocking member when said blocking member is in said locking position, and said barrier is returning to said closed position, whereby said barrier can return to said closed position even though said blocking member has returned to said locking position.

5. An animal feeding appliance in accordance with claim 4, wherein said blocking member comprises a bar, means mounting said bar for axial movement, said bar being formed with at least one cut-out, there being a part on said barrier corresponding with each said cut-out, which in said locking position of said bar engages with said bar to prevent opening of said barrier, but which in said release position of said bar can pass through said at least one cut-out, whereby said barrier is permitted to open.

6. An animal feeding appliance comprising a food container having a movable barrier biased into a closed position, but capable of opening movement when pushed by the head of an animal away from said closed position to give access to feed in the container; releaseable locking means normally locking said barrier in said closed position; battery operated electrical release means for releasing said locking means, and an electrical control circuit for controlling said release means, said control circuit including a distinguishing switch adapted to be operated by a distinguishing device carried by an animal, and so arranged that current is only drawn from said battery between the time when said distinguishing switch is operated and the time when said barrier is moved away from said closed position, said appliance being formed with a recess in the vicinity of said distinguishing switch for locating a flexible distinguishing device attached to the neck of an animal.

7. An animal feeding appliance according to claim 6, wherein at least one protrusion is provided in said recess to assist in retaining said flexible distinguishing device in said recess.

8. An animal feeding appliance according to claim 1, wherein said electrical release means comprises a solenoid in said circuit.

9. An animal feeding appliance comprising a food container; a barrier pivoted about a horizontal axis and biased by gravity into a closed position, but capable of opening movement about its axis when pushed by the head of an animal away from said closed position to give access to feed in the container, and releaseable locking means normally locking said barrier in said closed position; said locking means comprising a blocking member movable between a locking position where it obstructs movement of said barrier away from said closed position, and a release position where it permits movement of said barrier away from said closed position; means biasing said blocking member into said locking position; release means for moving said blocking member to said release position, and control means for controlling said release means; said control means including an actuator adapted to be operated by a distinguishing device carried by an animal; a movable latch on said barrier which said movable latch engages with said blocking member when said blocking member is in said locking position, and said barrier attempts to move away from said closed position; said latch being so arranged, that it is able to move with said barrier away from said closed position when said blocking member is in said release position, and said latch being further so arranged, that it is able to trip past said blocking member when said blocking member is in said locking position, and said barrier is returning to said closed position, whereby said barrier can return to said closed position even though said blocking member has returned to said locking position.

10. An animal feeding appliance in accordance with claim 9, wherein said blocking member comprises a bar, means mounting said bar for axial movement, said bar being formed with at least one cut-out, there being a part on said barrier corresponding with each said cut-out, which in said locking position of said bar engages with said bar to prevent opening of said barrier, but which in said release position of said bar can pass through said at least one cut-out, whereby said barrier is permitted to open.

11. An animal feeding appliance comprising a food container; a barrier pivoted about a horizontal axis and biased by gravity into a closed position, but capable of opening movement about its axis when pushed by the head of an animal away from said closed position to give access to feed in the container; a blocking member movable between a locking position where it obstructs movement of said barrier away from said closed position, and a release position where it permits movement of said barrier away from said closed position; means biasing said blocking member into said locking position; release means for moving said blocking member to said release position, and control means for controlling said release means; said control means including an actuator adapted to be operated by a distinguishing device carried by an animal; a latch on said barrier, said latch and barrier being so arranged, that said latch is able to move with said barrier away from said closed position, when said blocking member is in said release position, and said latch can trip past said blocking member when said blocking member is in said locking position, and said barrier is returning to said closed position, whereby said barrier can return to said closed position even though said blocking member has returned to said locking position.

12. An animal feeding appliance according to claim 11, wherein said latch is loaded by gravity into a lowered position, whereby said latch engages with said blocking member when said blocking member is in said locking position, and said latch is in said lowered position, but said latch is able to move against its gravity loading to enable it to trip past said blocking member when said barrier is returning to said closed position.

* * * * *